(12) United States Patent
Kurisawa et al.

(10) Patent No.: US 8,765,013 B2
(45) Date of Patent: *Jul. 1, 2014

(54) NEMATIC LIQUID CRYSTAL COMPOSITION AND LIQUID CRYSTAL DISPLAY DEVICE USING THE SAME

(75) Inventors: Kazuki Kurisawa, Saitama (JP);
Takeshi Kuriyama, Saitama (JP);
Shotaro Kawakami, Saitama (JP)

(73) Assignee: DIC Corporation, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/475,218

(22) Filed: May 18, 2012

(65) Prior Publication Data

US 2012/0292569 A1 Nov. 22, 2012

(30) Foreign Application Priority Data

May 20, 2011 (JP) ................................ 2011-113458

(51) Int. Cl.
*C09K 19/12* (2006.01)
*C09K 19/52* (2006.01)
*C09K 19/06* (2006.01)
*C09K 19/30* (2006.01)
*C09K 19/00* (2006.01)
*G02F 1/1333* (2006.01)
*C09K 19/02* (2006.01)

(52) U.S. Cl.
USPC .............. 252/299.66; 252/299.01; 252/299.6; 252/299.63; 428/1.1; 349/86; 349/182

(58) Field of Classification Search
USPC ............... 252/299.01, 299.6, 299.63, 299.66; 428/1.1; 349/86, 182
See application file for complete search history.

(56) References Cited

U.S. PATENT DOCUMENTS

2012/0292568 A1* 11/2012 Kuriyama et al. ....... 252/299.63

FOREIGN PATENT DOCUMENTS

| JP | 2003-307720 A | 10/2003 |
|---|---|---|
| JP | 2008-116931 A | 5/2008 |
| WO | 2010/084823 A1 | 7/2010 |

* cited by examiner

*Primary Examiner* — Geraldina Visconti
(74) *Attorney, Agent, or Firm* — Westerman, Hattori, Daniels & Adrian, LLP

(57) ABSTRACT

A polymerizable compound-containing liquid crystal composition includes at least one of compounds represented by general formulae (I) to (IV). A liquid crystal display device uses the liquid crystal composition.

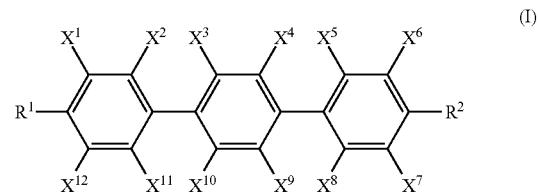

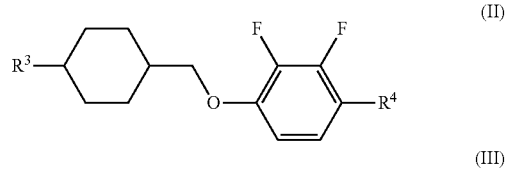

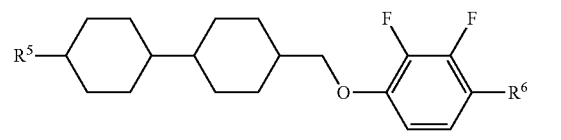

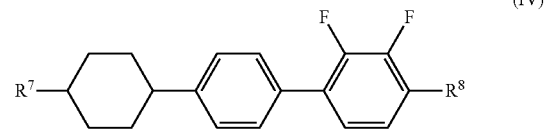

17 Claims, No Drawings

NEMATIC LIQUID CRYSTAL COMPOSITION AND LIQUID CRYSTAL DISPLAY DEVICE USING THE SAME

BACKGROUND OF THE INVENTION

1. Field of the Invention

The present invention relates to a polymerizable compound-containing liquid crystal composition and a liquid crystal display device using the same.

2. Description of the Related Art

PSA (Polymer Sustained Alignment)-type liquid crystal display devices have a structure in which a polymer structure is formed in a cell in order to control the pre-tilt angle of liquid crystal molecules, and have been put into practical use as liquid crystal display devices because of their rapid response and high contrast.

A PSA-type liquid crystal display device is manufactured by injecting a polymerizable composition containing a liquid crystal compound and a polymerizable compound between substrates, and polymerizing the polymerizable compound under a condition where liquid crystal molecules are aligned by applying a voltage, thereby fixing the alignment of the liquid crystal molecules. In the PSA-type liquid crystal display device, impurities and a change in alignment of the liquid crystal molecules (change in pre-tilt angle) are known as causes for image sticking as a display defect.

With respect to image sticking due to a change in pre-tilt angle of the liquid crystal molecules, in a configuration of a display device, a polymer structure is changed when the same pattern is continuously displayed for a long time, resulting in a change in pre-tilt angle. Therefore, a polymerizable compound which forms a polymer having a rigid structure with no change in the polymer structure is required.

In order to prevent image sticking by improving the rigidity of a polymer, it has been investigated to constitute a display device using a polymerizable compound having a structure of 1,4-phenylene group or the like, which contains only a ring structure and a polymerizable functional group (refer to Japanese Unexamined Patent Application Publication No. 2003-307720), or constitute a display device using a polymerizable compound having a biaryl structure (refer to Japanese Unexamined Patent Application Publication No. 2008-116931). However, such polymerizable compounds have low compatibility with liquid crystal compounds and thus, when a liquid crystal composition is prepared, precipitation of the polymerizable compounds occurs, leading to the need for improvement.

Further, the PAS-type liquid crystal display devices are used for liquid crystal televisions and the like and thus are highly required to have rapid response. As a method for improving the response speed, various combinations of liquid crystal compositions and polymerizable compounds (WO2010/084823) are disclosed. However, the PAS-type liquid crystal display devices using these liquid crystal compositions have unsatisfactory response speed, and further reduction in voltage is required. Further, the liquid crystal compositions contain chlorine atom-containing liquid crystal compounds and are thus undesirable because reliability of the liquid crystal compositions may be decreased due to the release of chlorine atoms by UV irradiation for polymerization.

Therefore, it is difficult to satisfy the characteristics required for a polymerizable compound-containing liquid crystal composition, such as the image sticking property of a display device, alignment stability, stability of the liquid crystal composition against precipitation, display characteristics, manufacture efficiency in manufacturing a PAS-type liquid crystal display device, etc., leading to the requirement for further improvement.

SUMMARY OF THE INVENTION

Accordingly, it is an object of the present invention to provide a polymerizable compound-containing liquid crystal composition which causes no precipitation within a wide temperature range and no failure in display characteristics, such as image sticking or the like, and which has a high polymerization rate and high alignment regulating force of a liquid crystal after polymerization. A further object of the present invention is to provide a PAS-type liquid crystal display device having excellent display quality without display unevenness and excellent display characteristics by using the polymerizable compound-containing liquid crystal composition.

As a result of research of various polymerizable compounds and non-polymerizable liquid crystal compounds, the inventors of the present invention found that the above-described objects can be achieved with a polymerizable compound-containing liquid crystal composition containing a polymerizable compound and a non-polymerizable liquid crystal compound each having a specified structure, leading to the achievement of the present invention.

The present invention provides a polymerizable compound-containing liquid crystal composition including, as a first component, at least one polymerizable compound represented by general formula (I):

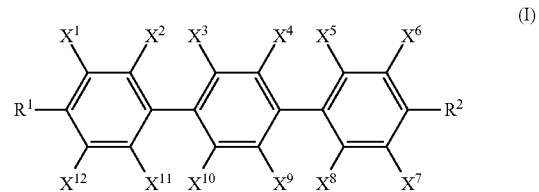

(I)

(wherein $R^1$ and $R^2$ each independently represent any of formulae (R-1) to (R-15) below,

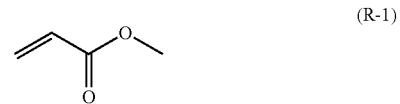

(R-1)

(R-2)

(R-3)

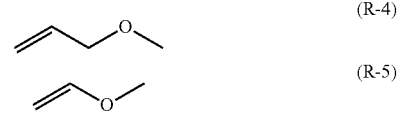

(R-4)

(R-5)

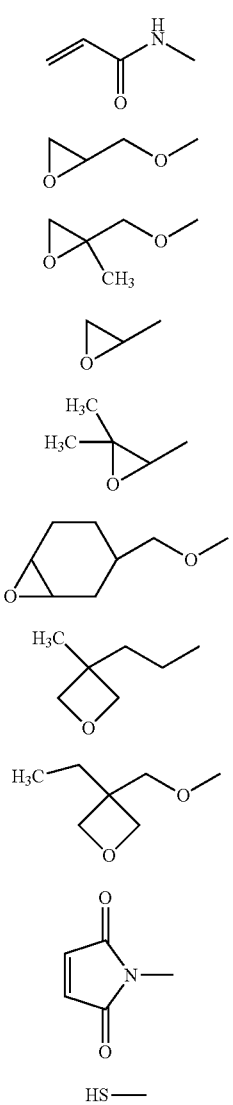

(R-6)
(R-7)
(R-8)
(R-9)
(R-10)
(R-11)
(R-12)
(R-13)
(R14)
(R-15)

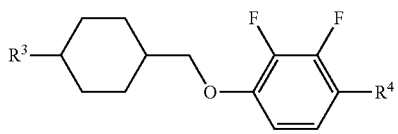

and $X^1$ to $X^{12}$ each independently represent a hydrogen atom, a trifluoromethyl group, a trifluoromethoxy group, a methyl group, a chlorine atom, or a fluorine atom); as a second component, at least one compound represented by general formula (II):

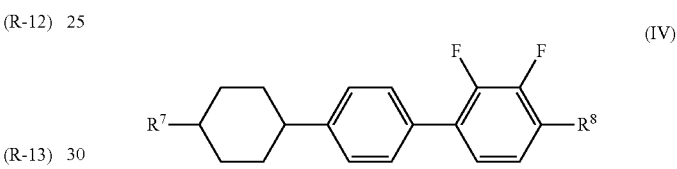

(wherein $R^3$ represents an alkyl group having 1 to 10 carbon atoms or an alkenyl group having 2 to 10 carbon atoms, in which at least one hydrogen atom present in the group may be substituted by a fluorine atom, and $R^4$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom); as a third component, at least one compound represented by general formula (III):

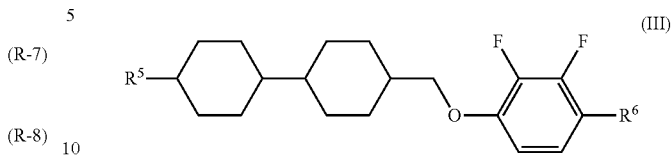

(wherein $R^5$ represents an alkyl group having 1 to 10 carbon atoms or an alkenyl group having 2 to 10 carbon atoms, in which at least one hydrogen atom present in the group may be substituted by a fluorine atom, and $R^6$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom); and as a fourth component, at least one compound represented by general formula (IV):

$$R^7 \text{—} \bigcirc \text{—} \bigcirc \text{—} \bigcirc \text{—} R^8 \quad (IV)$$

(wherein $R^7$ represents an alkyl group having 1 to 10 carbon atoms or an alkenyl group having 2 to 10 carbon atoms, in which at least one hydrogen atom present in the group may be substituted by a fluorine atom, and $R^8$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom). The present invention further provides a liquid crystal display device using the liquid crystal composition.

Since a polymerizable compound and a non-polymerizable liquid crystal compound as essential components in the present invention have excellent compatibility with each other, a stable liquid crystal composition maintaining a nematic state even at a low temperature can be provided. In addition, the non-polymerizable liquid crystal compound of the present invention has high stability against ultraviolet rays and heat, and the polymerizable compound represented by the general formula (I) has a high polymerization rate and thus can shorten the polymerization time as compared with a biphenyl polymerizable compound, thereby significantly decreasing adverse effects of light and the like on the non-polymerizable liquid crystal compound. Therefore, it is possible to significantly decrease a display defect in a liquid crystal display device imparted with alignment through polymerization of the polymerizable compound in the liquid crystal composition, and improve the manufacture yield. In addition, a PSA-type liquid crystal display device using the polymerizable liquid crystal composition of the present invention exhibits a high response speed, and thus the liquid crystal composition is useful as a liquid crystal composition for the liquid crystal display device.

DESCRIPTION OF THE PREFERRED EMBODIMENTS

Polymerizable Compound

In general formula (I) representing a polymerizable compound used in the present invention, $R^1$ and $R^2$ each represent a polymerizable group. Examples thereof include structures described below.

These polymerizable groups are cured by radical polymerization, radical addition polymerization, cation polymerization, or anion polymerization. In particular, in performing an ultraviolet polymerization method, formula (R-1), formula (R-2), formula (R-4), formula (R-5), formula (R-7), formula (R-11), formula (R-13), or formula (R-15) is preferred, formula (R-1), formula (R-2), formula (R-7), formula (R-11), or formula (R-13) is more preferred, and formula (R-1) or formula (R-2) is particularly preferred.

In the general formula (I), $X^1$ to $X^{12}$ each independently represent a hydrogen atom, a trifluoromethyl group, a trifluoromethoxy group, a methyl group, or a fluorine atom. However, in view of compatibility with a non-polymerizable liquid crystal compound, preferably, at least one of $X^1$ to $X^{12}$ is a trifluoromethyl group, a trifluoromethoxy group, a methyl group, or a fluorine atom, and at least one of $X^1$ to $X^{12}$ is a methyl group, or a fluorine atom. In addition, preferably, $X^1$, $X^6$, $X^7$, and $X^{12}$ are each a hydrogen atom, and at least one of $X^2$ to $X^5$ and $X^8$ to $X^{11}$ is a methyl group or a fluorine atom.

Preferred examples of the polymerizable compound represented by the general formula (I) include those of general formulae (I-1) to (I-40).

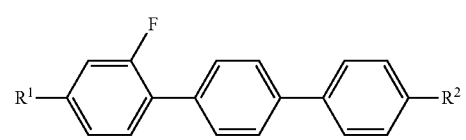 (I-6)
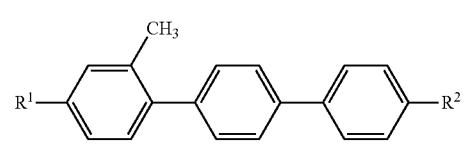 (I-7)
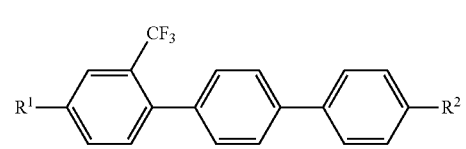 (I-8)
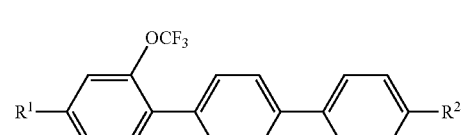 (I-9)
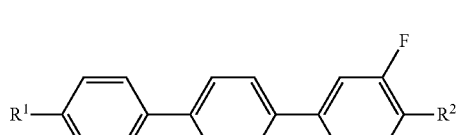 (I-10)
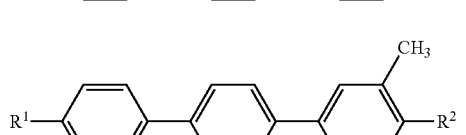 (I-11)
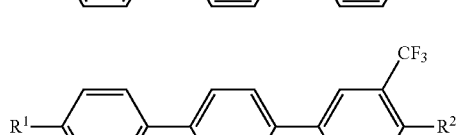 (I-12)
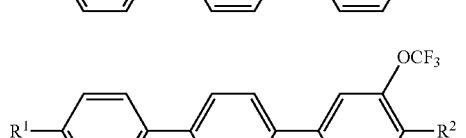 (I-13)
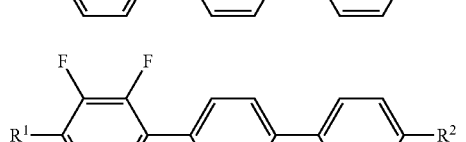 (I-14)
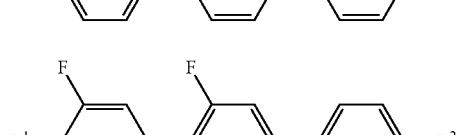 (I-15)
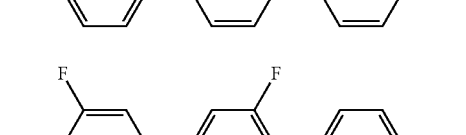 (I-16)
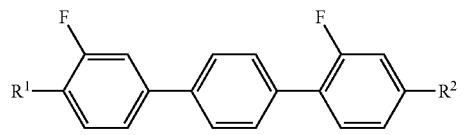 (I-17)
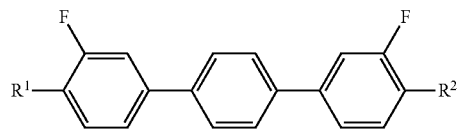 (I-18)
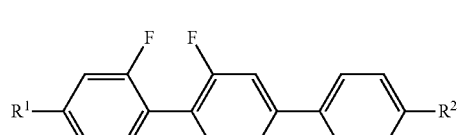 (I-19)
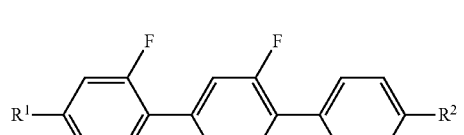 (I-20)
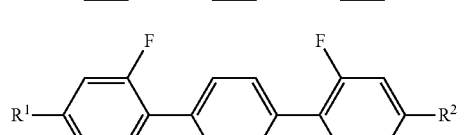 (I-21)
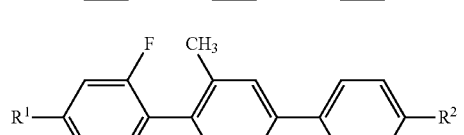 (I-22)
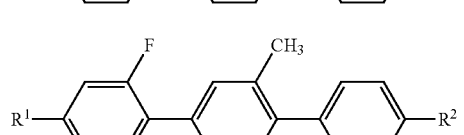 (I-23)
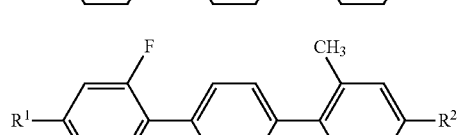 (I-24)
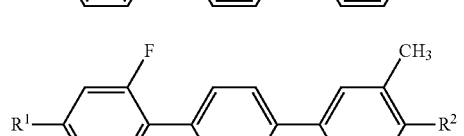 (I-25)
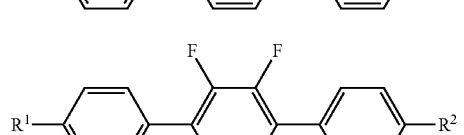 (I-26)
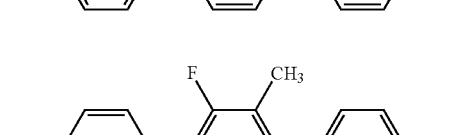 (I-27)

(I-28)
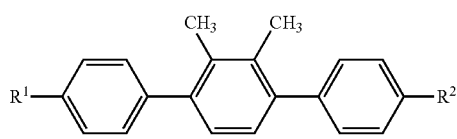

(I-29)
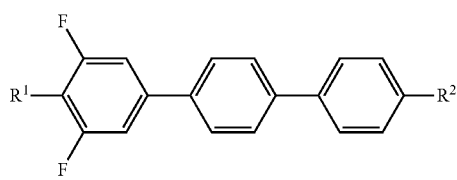

(I-30)
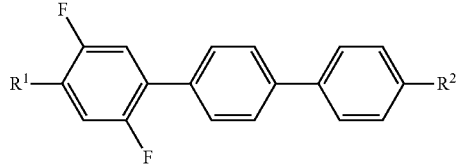

(I-31)
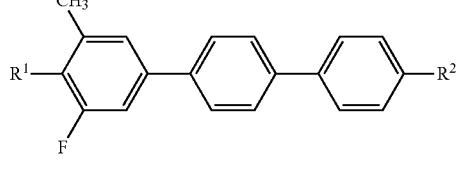

(I-32)
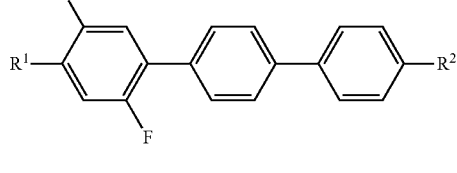

(I-33)
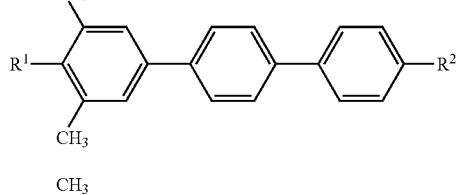

(I-34)
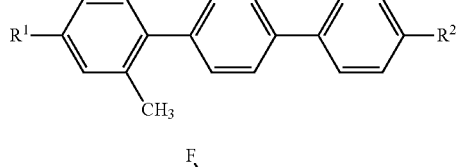

(I-35)
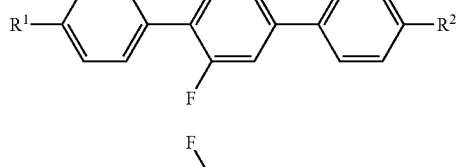

(I-36)
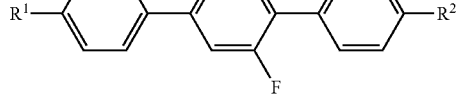

(I-37)
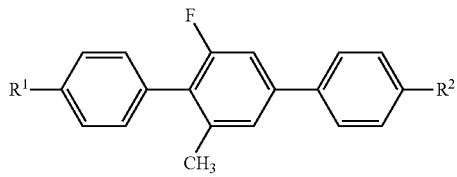

(I-38)
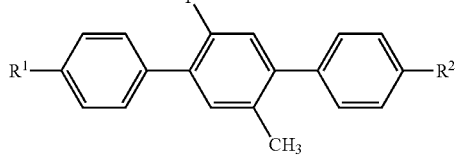

(I-39)
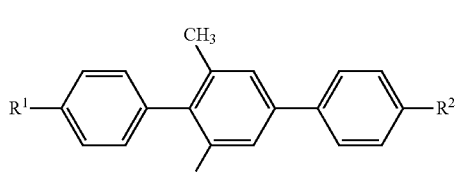

(I-40)
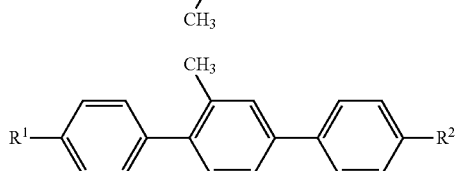

Among these polymerizable compounds, the polymerizable compounds represented by the general formulae (I-2), (I-3), (I-21), (I-26), and (I-36) are particularly preferred because they have good compatibility with non-polymerizable liquid crystal compounds and can produce a stable liquid crystal composition maintaining a nematic state even at a low temperature. In addition, the polymerizable compounds containing skeletons represented by the general formulae (I-2), (I-3), (I-21), (I-26), and (I-36) are preferred because of their high polymerization rates in the polymerizable liquid crystal composition, the proper alignment regulating force after polymerization, and the good alignment state established in the liquid crystal composition. Further, the low alignment regulating force causes a display defect such as a change in alignment of liquid crystal molecules. Therefore, when the alignment regulating force is considered to be important, the polymerizable compound represented by the general formula (I-2) or (I-3) is particularly preferred.

A polymerizable compound-containing liquid crystal composition of the present invention contains at least one polymerizable compound represented by the general formula (I), but preferably contains 1 to 5 compounds and more preferably 1 to 3 compounds. With a low content of the polymerizable compound represented by the general formula (I), the alignment regulating force for the liquid crystal composition is weakened. In contrast, with an excessively high content of the polymerizable compound represented by the general formula (I), the energy required for polymerization is increased to increase the amount of the polymerizable compound remaining unpolymerized, thereby causing a display defect. Therefore, the lower limit of the content is preferably 0.01% by mass, more preferably 0.03% by mass, and most preferably 0.05% by mass, and the upper limit is preferably 2.0% by mass, more preferably 1.0% by mass, and most preferably 0.5% by mass.

<Liquid Crystal Composition>

In general formula (II) representing a compound used as a second component, $R^3$ represents an alkyl group having 1 to 10 carbon atoms or an alkenyl group having 2 to 10 carbon atoms, wherein at least one hydrogen atom present in the group may be substituted by a fluorine atom. $R^3$ is more preferably an alkyl group having 1 to 5 carbon atoms or an alkenyl group having 2 to 5 carbon atoms and still more preferably a linear group. In addition, $R^4$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, wherein at least one hydrogen atom present in the group may be substituted by a fluorine atom. $R^4$ is more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms and still more preferably a linear group.

The polymerizable compound-containing liquid crystal composition of the present invention contains at least one compound represented by the general formula (II), but preferably contains 1 to 6 compounds and more preferably 2 to 5 compounds. The content of the compound represented by the general formula (II) is 5 to 35% by mass and more preferably 10 to 30% by mass. The compound has a high absolute value of negative dielectric constant anisotropy, but at a high content, the compound tends to increase viscosity. Therefore, when low viscosity is considered to be important, the upper limit is preferably 30% by mass and more preferably 25% by mass. In addition, in a liquid crystal display device in which a liquid crystal phase in a nematic state is driven, the development of smectic phase is undesired, and the compound at a high content may increase the temperature of smectic-nematic phase transition. Therefore, when the low temperature of smectic-nematic phase transition is considered to be important, the upper limit of the content is preferably 30% by mass and more preferably 25% by mass. When a high absolute value of negative dielectric constant anisotropy is considered to be important, the compound preferably has a high content, and the lower limit of the content is preferably 5% by mass, more preferably 10% by mass, particularly preferably 20% by mass, and most preferably 30% by mass.

In general formula (III) representing a compound used as a third component, $R^5$ represents an alkyl group having 1 to 10 carbon atoms or an alkenyl group having 2 to 10 carbon atoms, wherein at least one hydrogen atom present in the group may be substituted by a fluorine atom. $R^5$ is more preferably an alkyl group having 1 to 5 carbon atoms or an alkenyl group having 2 to 5 carbon atoms and still more preferably a linear group. In addition, $R^6$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, wherein at least one hydrogen atom present in the group may be substituted by a fluorine atom. $R^6$ is more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms and still more preferably a linear group.

The polymerizable compound-containing liquid crystal composition of the present invention contains at least one compound represented by the general formula (III), but preferably contains 1 to 6 compounds and more preferably 2 to 5 compounds. The content of the compound represented by the general formula (III) is 5 to 35% by mass and more preferably 10 to 30% by mass. Such a compound has a high absolute value of negative dielectric constant anisotropy, but at a high content, the compound tends to increase viscosity. Therefore, when low viscosity is considered to be important, the upper limit is preferably 30% by mass and more preferably 25% by mass. In addition, in a liquid crystal display device in which a liquid crystal phase in a nematic state is driven, the development of smectic phase is undesired, and the compound at a high content may increase the temperature of smectic-nematic phase transition. Therefore, when the low temperature of smectic-nematic phase transition is considered to be important, the upper limit of the content is preferably 30% by mass and more preferably 25% by mass. When a high absolute value of negative dielectric constant anisotropy is considered to be important, the compound preferably has a high content, and the lower limit of the content is preferably 5% by mass, more preferably 10% by mass, particularly preferably 20% by mass, and most preferably 30% by mass.

In general formula (IV) representing a compound used as a fourth component, $R^7$ represents an alkyl group having 1 to 10 carbon atoms or an alkenyl group having 2 to 10 carbon atoms, wherein at least one hydrogen atom present in the group may be substituted by a fluorine atom. $R^7$ is more preferably an alkyl group having 1 to 5 carbon atoms or an alkenyl group having 2 to 5 carbon atoms and still more preferably a linear group. In addition, $R^8$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, wherein at least one hydrogen atom present in the group may be substituted by a fluorine atom. $R^8$ is more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms and still more preferably a linear group.

The polymerizable compound-containing liquid crystal composition of the present invention contains at least one compound represented by the general formula (IV), but preferably contains 2 to 6 compounds and more preferably 3 to 5 compounds. The content of the compound represented by the general formula (IV) is 5 to 35% by mass and more preferably 10 to 30% by mass. Such a compound has high refractive index anisotropy and a high absolute value of negative dielectric constant anisotropy, but at a high content, the compound tends to increase viscosity. Therefore, when low viscosity is considered to be important, the upper limit is preferably 30% by mass and more preferably 25% by mass. In addition, in a liquid crystal display device in which a liquid crystal phase in a nematic state is driven, the development of smectic phase is undesired, and the compound at a high content may increase the temperature of smectic-nematic phase transition. Therefore, when the low temperature of smectic-nematic phase transition is considered to be important, the upper limit of the content is preferably 30% by mass and more preferably 25% by mass. When a high absolute value of negative dielectric constant anisotropy is considered to be important, the compound preferably has a high content, and the lower limit of the content is preferably 5% by mass, more preferably 10% by mass, particularly preferably 20% by mass, and most preferably 30% by mass.

The compounds contained in the polymerizable compound-containing liquid crystal composition of the present invention have no partial structure such as —O—O—, —O—S—, or —S—S—, in which heteroatoms are directly bonded together. In addition, the compounds preferably include only liquid crystal compounds each having no carbon-carbon unsaturated bond or having only a carbon-carbon unsaturated bond which is present in an aromatic ring or conjugated with π electrons of an aromatic ring. Also, the compounds preferably include no compound having an alkenyl group, and side chains of all liquid crystal compounds are more preferably alkyl groups or alkoxy groups. In order to suppress or avoid the occurrence of display defects such as image sticking, nonuniformity in display, etc., each of the liquid crystal compounds essentially contains a cyclohexane ring, a benzene ring, or a fluorine-substituted benzene ring in its structure, but substitution with another halogen atom, such as chlorine, is undesired. The use of a chlorine-substituted liquid crystal compound is unpractical because it causes defective display.

<Polymerizable Compound-Containing Liquid Crystal Composition>

The polymerizable compound-containing liquid crystal composition of the present invention is characterized by containing at least one compound represented by the general formula (I), at least one compound represented by the general formula (II), at least one compound represented by the general formula (III), and at least one compound represented by the general formula (IV).

<Liquid Crystal Composition and Liquid Crystal Display Device>

The liquid crystal composition of the present invention preferably has a nematic-isotropic liquid phase transition temperature ($T_{ni}$) of 60° C. to 120° C., and the lower limit thereof is more preferably 65° C. and particularly preferably 70° C. The upper limit is more preferably 100° C. and particularly preferably 90° C. The dielectric constant anisotropy $\Delta\in$ at 25° C. is preferably −2.0 to −6.0, more preferably −2.5 to −5.0, particularly preferably −2.5 to −3.5. The refractive index anisotropy $\Delta n$ at 25° C. is preferably 0.08 to 0.13 and more preferably 0.09 to 0.12. In further detail, in response to a thin cell gap, the refractive index anisotropy $\Delta n$ at 25° C. is preferably 0.10 to 0.12, while in response to a thick cell gap, the refractive index anisotropy $\Delta n$ at 25° C. is preferably 0.08 to 0.10. The viscosity at 20° C. is preferably 10 to 30 mPa·s, more preferably 10 to 25 mPa·s, and particularly preferably 10 to 20 mPa·s.

The liquid crystal composition of the present invention may further contain, besides the above-described compounds, a usual nematic liquid crystal, smectic liquid crystal, cholesteric liquid crystal, antioxidant, ultraviolet absorber, polymerization initiator, or polymerization inhibitor.

Although polymerization proceeds in the polymerizable compound-containing liquid crystal composition of the present invention even in the absence of the polymerization initiator, the composition may contain the polymerization initiator for promoting polymerization. Examples of the polymerization initiator include benzoin ethers, benzophenones, acetophenones, benzylketals, acylphosphine oxides, and the like.

In order to improve storage stability, a stabilizer can be added to the liquid crystal composition of the present invention. Examples of the stabilizer which can be used include hydroquinones, hydroquinone monoalkyl ethers, tert-butylcatechols, pyrogallols, thiophenols, nitro compounds, β-naphthylamines, β-naphthols, nitroso compounds, and the like. The amount of the stabilizer added is preferably in the range of 0.005 to 1% by mass, more preferably 0.02 to 0.5% by mass, and particularly preferably 0.03 to 0.1% by mass relative to the liquid crystal composition.

The liquid crystal composition of the present invention is imparted with a liquid crystal aligning ability through polymerization of the polymerizable compound in the liquid crystal composition, and is used for a liquid crystal display device in which the amount of transmitted light is controlled by using birefringence of the liquid crystal composition. The liquid crystal composition is useful for liquid crystal display devices such as AM-LCD (active matrix liquid crystal display device), TN (twisted nematic liquid crystal display device), STN-LCD (super twisted nematic liquid crystal display device), OCB-LCD (optically compensated birefringence liquid crystal display device), and IPS-LCD (in-plane switching liquid crystal display device), and particularly useful for AM-LCD. The liquid crystal composition can be used for a transmissive or reflective liquid crystal display device.

Two substrates of a liquid crystal cell used in the liquid crystal display device can be made of a transparent material with flexibility, such as glass or plastic, and one of the substrates may be made of an opaque material such as silicon or the like. A transparent substrate including a transparent electrode can be formed by, for example, sputtering indium-tin oxide (ITO) on a transparent substrate such as a glass plate.

A color filter can be formed by, for example, a pigment dispersion method, a printing method, an electrodeposition method, or a dyeing method. The pigment dispersion method is described as an example of the method for forming the color filter. A curable colored composition for a color filter is applied to the transparent substrate, patterned, and then cured by heating or light irradiation. This process is performed for each of the three colors of red, green, and blue, forming pixel portions for the color filter. Alternatively, a pixel electrode provided with an active element such as TFT, a thin-film diode, a metal insulator, a metal resistivity element, or the like may be provided on the substrate.

The substrates are opposed to each other so that the transparent electrode layers face inward. In this case, the distance between the substrates may be adjusted using a spacer so that the thickness of the resultant light control layer is preferably 1 to 100 μm and more preferably 1.5 to 10 μm. When a polarizing plate is used, the product of refractive index anisotropy $\Delta n$ of the liquid crystal and cell thickness d is preferably adjusted to maximize the contrast. In addition, when two polarizing plates are provided, the polarizing axis of each of the polarizing plates can be adjusted to improve the viewing angle and contrast. Further, a retardation film can be used for widening the viewing angle. Examples of the spacer include glass particles, plastic particles, alumina particles, photoresist materials, and the like. Then, a sealing agent such as an epoxy-based thermosetting composition is screen-printed on each of the substrates provided with a liquid crystal injection port, the substrates are bonded together, and the sealing agent is thermally cured by heating.

As a method for holding the polymerizable compound-containing liquid crystal composition between the two substrates, a usual vacuum injection method or an ODF (One Drop Fill) method can be used.

A preferred method as a method for polymerizing the polymerizable compound is to polymerize the compound by irradiation with one type or combination of two or more types of active energy rays such as ultraviolet rays, electron beams, and the like, or by successive irradiation with these types of active energy rays because a proper polymerization rate is desired for achieving good alignment performance for the liquid crystal. In the use of ultraviolet rays, a polarized light source or an unpolarized light source may be used. When the polymerizable compound-containing liquid crystal composition is polymerized in the state of being held between the two substrates, at least the irradiation-side substrate must be imparted with proper transparency for the active energy rays. Another method may be used, in which after a specified portion is polymerized by light irradiation using a mask, the alignment state of an unpolymerized portion is changed by changing the condition such as an electric field, a magnetic field, or temperature, followed by further polymerization through irradiation with active energy rays. In particular, ultraviolet exposure is preferably performed with an alternating current electric field applied to the polymerizable compound-liquid crystal composition. The applied alternating current electric field is preferably has a frequency of 10 Hz to 10 kHz and more preferably a frequency of 60 Hz to 10 kHz, and the voltage is selected depending to the desired pretilt angle of the liquid crystal display device. That is, the pretilt angle of the liquid crystal display device can be controlled by the applied voltage. In a MVA-mode liquid crystal display device, the pretilt angle is preferably controlled to 80 degrees to 89.9 degrees from the viewpoint of alignment stability and contrast.

The temperature of irradiation preferably falls in a temperature range where the liquid crystal state of the liquid crystal composition of the present invention is maintained. Polymerization is preferably performed at a temperature close to room temperature, i.e., typically a temperature of 15 to 35° C. As a lamp for emitting ultraviolet rays, a metal halide lamp, a high-pressure mercury lamp, an ultrahigh-pressure mercury lamp, or the like can be used. In addition, the wavelength of irradiating ultraviolet rays preferably falls in an ultraviolet wavelength region excluding an absorption wavelength region of the liquid crystal composition, and, if required, ultraviolet rays may be partially cut off. The intensity of the irradiating ultraviolet rays is preferably 0.1 mW/cm$^2$ to 100 W/cm$^2$ and more preferably 2 mW/cm$^2$ to 50 W/cm$^2$. The energy of the irradiating ultraviolet rays can be appropriately adjusted, but is preferably 10 mJ/cm$^2$ to 500 J/cm$^2$ and more preferably 100 mJ/cm$^2$ to 200 J/cm$^2$. The intensity may be changed during ultraviolet irradiation. The time of ultraviolet irradiation is appropriately selected depending on the intensity of the irradiating ultraviolet rays, but is preferably 10 seconds to 3600 seconds and more preferably 10 seconds to 600 seconds.

EXAMPLES

The present invention is described in further detail below with reference to examples, but the present invention is not limited to these examples. In a composition of each of the examples and comparative examples, "%" represents "% by mass".

In the examples, the measured characteristics are as follows.

$T_{ni}$: nematic-isotropic liquid phase transition temperature (° C.)
Δn: refractive index anisotropy at 25° C.
Δ∈: dielectric constant anisotropy at 25° C.
η: viscosity at 20° C. (mPa·s)

(Method for Measuring Amount of Residual Monomer after UV Curing)

After a liquid crystal composition is injected into a liquid crystal cell, a polymerizable compound is polymerized by UV irradiation. Then, the liquid crystal cell is disassembled to obtain an acetonitrile solution of elution components including a liquid crystal material, a polymer, and an unpolymerized polymerizable compound. The solution is subjected to high-performance liquid chromatography (column: reverse-phase nonpolar column, developing solvent: acetonitrile or acetonitrile/water, detector: UV detector) to measure a peak area of each of the components. The amount of residual polymerizable compound is determined from a ratio of the peak area of the unpolymerized polymerizable compound to that of the liquid crystal material as an indicator. The amount of residual monomer is determined from this value and the initial amount of the polymerizable compound added. The detection limit of the amount of the remaining polymerizable compound is 500 ppm.

(Method for Evaluating Image Sticking)

A voltage is applied to a liquid crystal display device after polymerization so as to form a black-and-white checkered pattern, and a change in luminance is visually observed when a half tone is displayed at each elapsed time.

Example 1

A polymerizable compound-containing liquid crystal composition CLC-1 including 99.7% of liquid crystal composition LC-1 and 0.3% of a polymerizable compound represented by general formula (I-1) was prepared, the liquid crystal composition LC-1 containing a compound represented by the general formula (I), a compound represented by the general formula (II), a compound represented by the general formula (III), and a compound represented by the general formula (IV). The prepared polymerizable compound-containing liquid crystal composition CLC-1 and the physical property values thereof are shown below.

LC-1

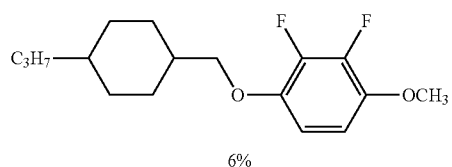

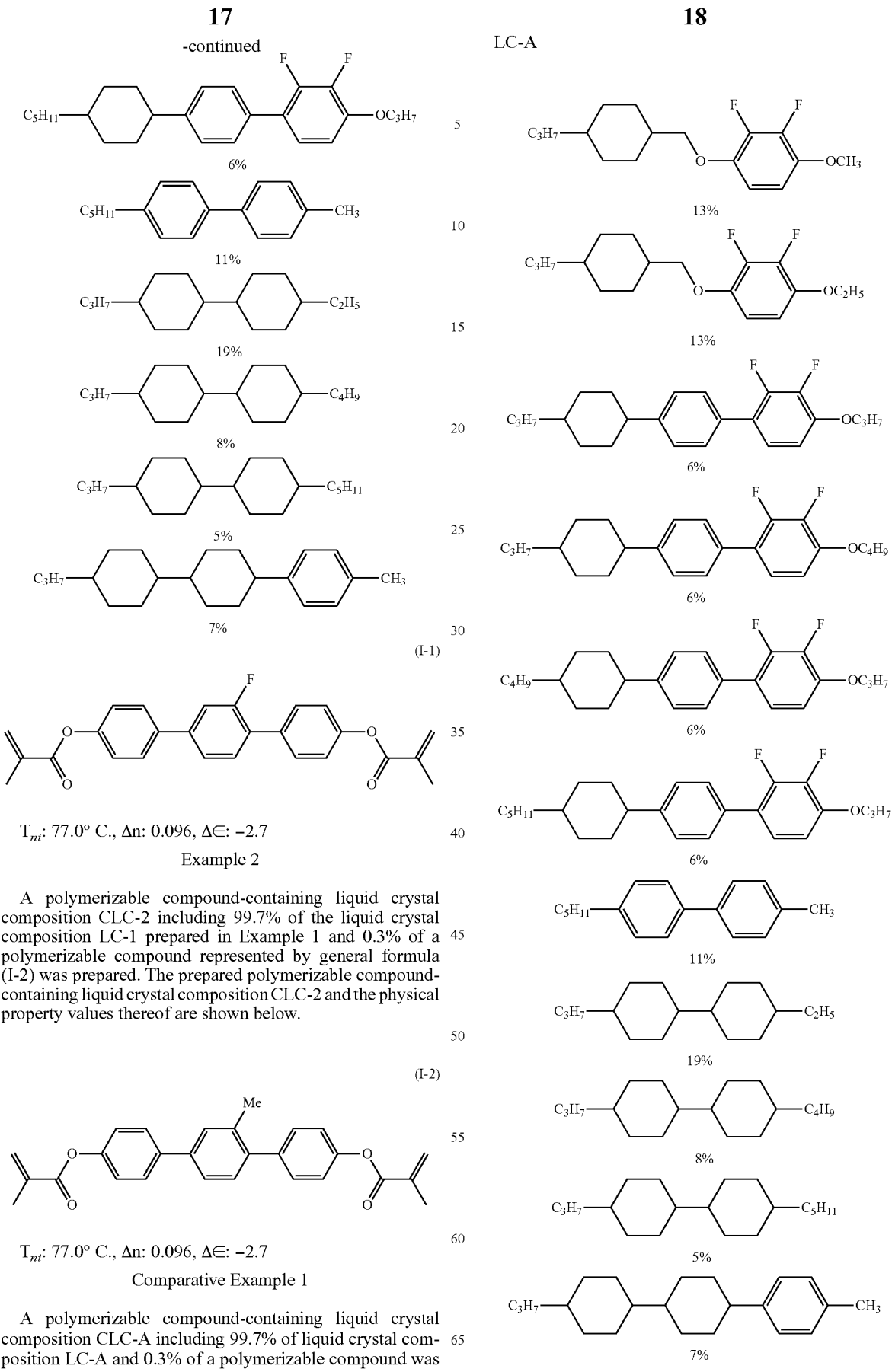

$T_{ni}$: 77.0° C., Δn: 0.096, Δ∈: −2.7

Example 2

A polymerizable compound-containing liquid crystal composition CLC-2 including 99.7% of the liquid crystal composition LC-1 prepared in Example 1 and 0.3% of a polymerizable compound represented by general formula (I-2) was prepared. The prepared polymerizable compound-containing liquid crystal composition CLC-2 and the physical property values thereof are shown below.

$T_{ni}$: 77.0° C., Δn: 0.096, Δ∈: −2.7

Comparative Example 1

A polymerizable compound-containing liquid crystal composition CLC-A including 99.7% of liquid crystal composition LC-A and 0.3% of a polymerizable compound was prepared.

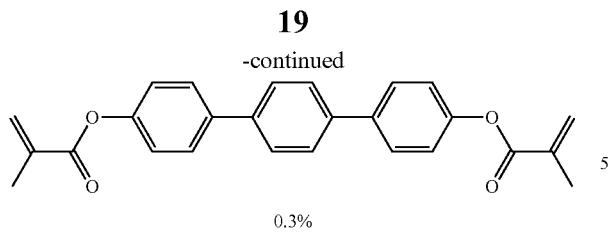

0.3%

The polymerizable compound-containing liquid crystal composition CLC-A showed $T_{ni}$: 58.3° C., Δn: 0.089, and Δ∈: −2.7. The polymerizable compound-containing liquid crystal composition does not contain a compound represented by the general formula (III) of the present invention. With this composition, it is impossible to maintain a dielectric constant without decreasing $T_{ni}$.

Comparative Example 2

A polymerizable compound-containing liquid crystal composition CLC-B including 99.7% of liquid crystal composition LC-B and 0.3% of a polymerizable compound represented by general formula (I-2) was prepared.

LC-B

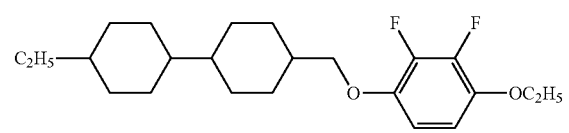

13%

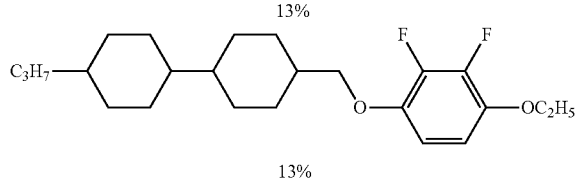

13%

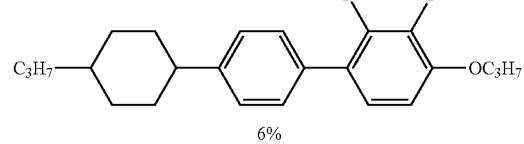

6%

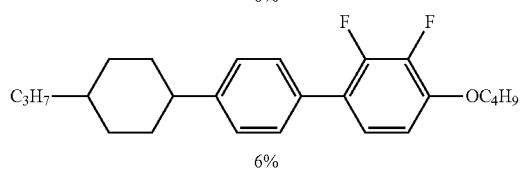

6%

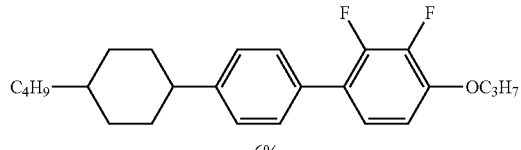

6%

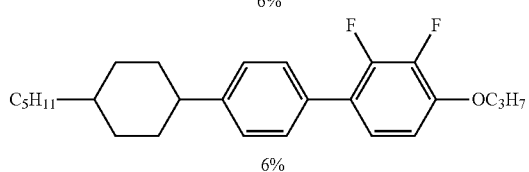

6%

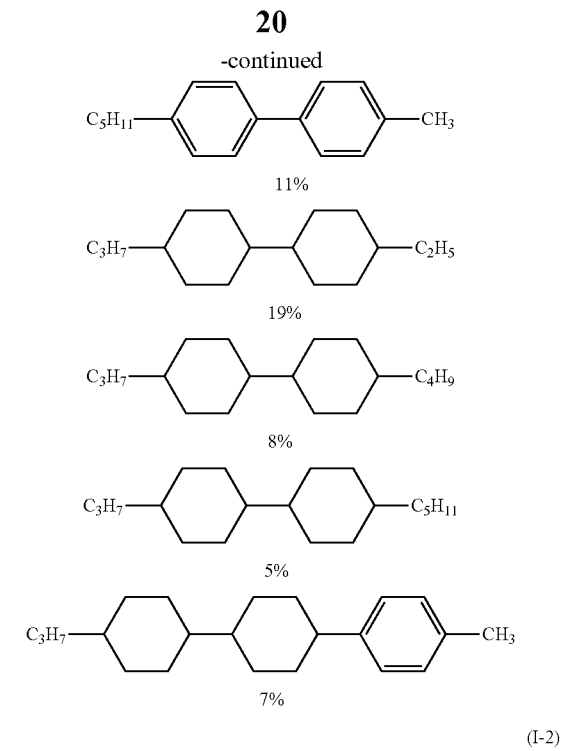

(I-2)

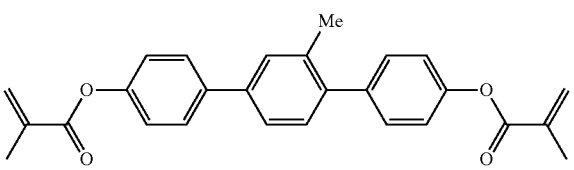

The polymerizable compound-containing liquid crystal composition CLC-B showed $T_{ni}$: 95.8° C., Δn: 0.101, and Δ∈: −2.8. The polymerizable compound-containing liquid crystal composition does not contain a compound represented by the general formula (II) of the present invention. With this composition, a dielectric constant can be maintained, but $T_{ni}$ cannot be adjusted, and an increase in viscosity is observed.

Comparative Example 3

A polymerizable compound-containing liquid crystal composition CLC-C including 99.7% of liquid crystal composition LC-C and 0.3% of a polymerizable compound represented by general formula (I-1) was prepared.

LC-C

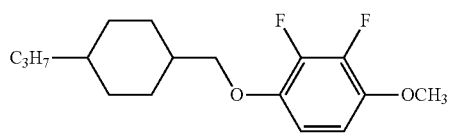

12%

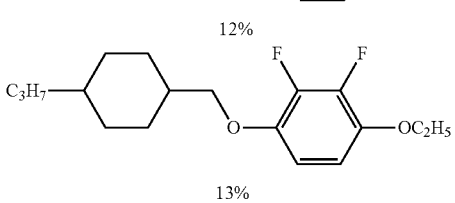

13%

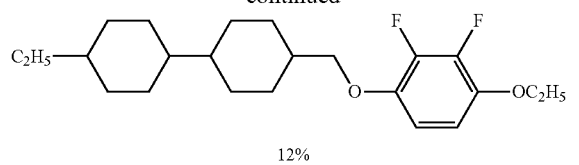

12%

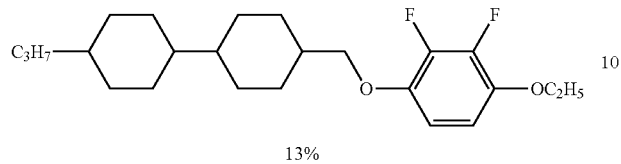

13%

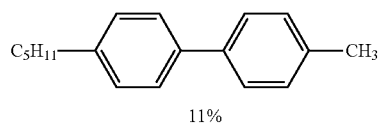

11%

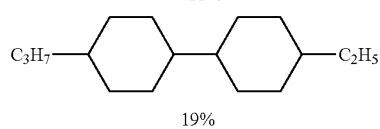

19%

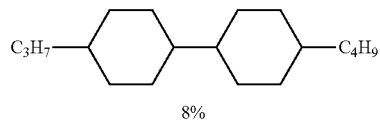

8%

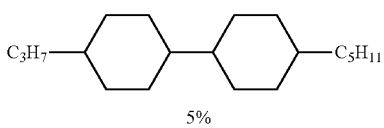

5%

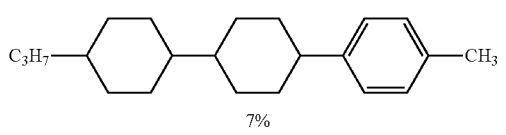

7%

(I-1)

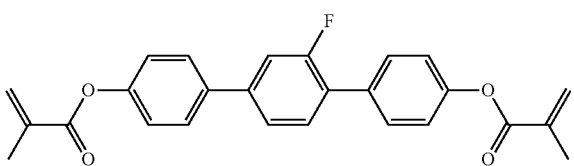

The polymerizable compound-containing liquid crystal composition CLC-C showed $T_{ni}$: 59.7° C., $\Delta n$: 0.078, and $\Delta \in$: −3.5. The polymerizable compound-containing liquid crystal composition does not contain a compound represented by the general formula (IV) of the present invention. With this composition, a dielectric constant can be maintained, but $T_n$, and $\Delta n$ cannot be adjusted.

Comparative Example 4

A polymerizable compound-containing liquid crystal composition CLC-D including 99.7% of the liquid crystal composition LC-1 prepared in Example 1 and 0.3% of a polymerizable compound represented by formula (A) and described in Japanese Unexamined Patent Application Publication No. 2003-307720.

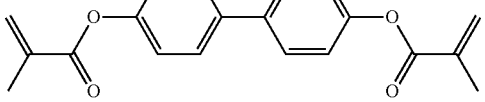

(A)

Example 3 and Comparative Example 5

Each of the polymerizable compound-containing liquid crystal compositions of Example 1 and Comparative Example 4 was injected, by a vacuum injection method, into a cell with ITO having a cell gap of 3.5 μm and a polyimide alignment film applied thereto for inducing homeotropic alignment. The pretilt angle of the cell was measured, and then the liquid crystal cell was irradiated with ultraviolet rays from a high-pressure mercury vapor lamp through a filter for cutting off ultraviolet rays of 320 nm or less with a rectangular wave of a frequency of 1 kHz and 1.8 V applied. Ultraviolet irradiation was performed for 600 seconds so that the intensity of irradiation of a cell surface was 15 mW/cm² to polymerize the polymerizable compound in the polymerizable compound-containing liquid crystal composition, thereby producing a homeotropic liquid crystal display device.

As a result of liquid chromatographic analysis of the content of the unpolymerized polymerizable compound in the device, an unpolymerized compound was detected in the homeotropic liquid crystal display device using the polymerizable compound-containing liquid crystal composition of Comparative Example 4. This revealed that polymerization of the polymerizable compound-containing liquid crystal composition of Example 1 is completed with lower energy than that for the polymerizable compound-containing liquid crystal composition of Comparative Example 4.

Example 4 and Comparative Example 6

Each of the polymerizable compound-containing liquid crystal compositions of Example 2 and Comparative Example 4 was injected, by a vacuum injection method, into a cell with ITO having a cell gap of 3.5 μm and a polyimide alignment film applied thereto for inducing homeotropic alignment. The pretilt angle of the cell was measured, and then the liquid crystal cell was irradiated with ultraviolet rays from a high-pressure mercury vapor lamp through a filter for cutting off ultraviolet rays of 320 nm or less with a rectangular wave of a frequency of 1 kHz and 1.8 V applied. Ultraviolet irradiation was performed for 600 seconds so that the intensity of irradiation of a cell surface was 15 mW/cm² to polymerize the polymerizable compound in the polymerizable compound-containing liquid crystal composition, thereby producing a homeotropic liquid crystal display device.

As a result of liquid chromatographic analysis of the content of the unpolymerized polymerizable compound in the device, an unpolymerized compound was detected in the homeotropic liquid crystal display device using the polymerizable compound-containing liquid crystal composition of Comparative Example 4. This revealed that polymerization of the polymerizable compound-containing liquid crystal composition of Example 1 is completed with lower energy than that for the polymerizable compound-containing liquid crystal composition of Comparative Example 4.

Example 5 and Comparative Example 7

Each of the polymerizable compound-containing liquid crystal compositions of Examples 1 and 2 and Comparative Examples 1 to 4 was subjected to a low-temperature storage test. As a result, Example 1 maintained a nematic state at −20° C. for 2 weeks.

The polymerizable compound-containing liquid crystal compositions of Comparative Examples 1 and 3 maintained a nematic state only for 1 day, and precipitation was observed on the third day. The polymerizable compound-containing liquid crystal compositions of Comparative Examples 2 and 4 maintained a nematic state only for 1 week, and precipitation was observed in the second week. This confirmed that the polymerizable compound-containing liquid crystal compositions of Examples 1 and 2 maintain a nematic state within a wide temperature range and are very useful.

TABLE 1

|  | Low-temperature storage test −20° C. |
| --- | --- |
| Example 1 | Maintaining nematic for 336 hours |
| Example 2 | Maintaining nematic for 336 hours |
| Comparative Example 1 | Maintaining nematic for 24 hours |
| Comparative Example 2 | Maintaining nematic for 168 hours |
| Comparative Example 3 | Maintaining nematic for 24 hours |
| Comparative Example 4 | Maintaining nematic for 168 hours |

What is claimed is:

1. A polymerizable compound-containing liquid crystal composition comprising, as a first component, at least one polymerizable compound represented by general formula (I):

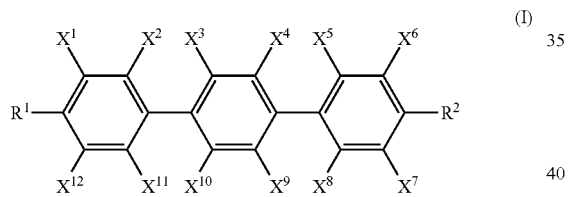

wherein $R^1$ and $R^2$ each independently represent any of formulae (R-1) to (R-15) below,

(R-1)

(R-2)

(R-3)

(R-4)

(R-5)

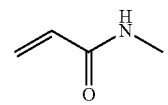
(R-6)

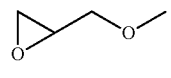
(R-7)

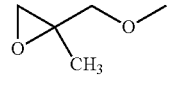
(R-8)

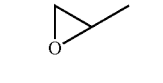
(R-9)

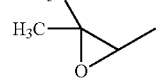
(R-10)

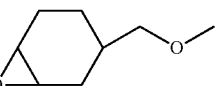
(R-11)

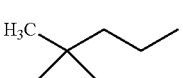
(R-12)

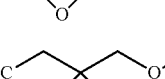
(R-13)

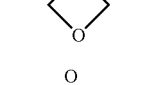
(R-14)

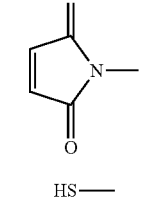
(R-15)

and $X^1$ to $X^{12}$ each independently represent a hydrogen atom, a trifluoromethyl group, a trifluoromethoxy group, a methyl group, a chlorine atom, or a fluorine atom; as a second component, at least one compound represented by general formula (II):

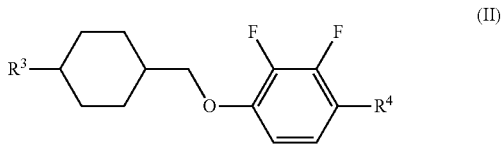
(II)

wherein $R^3$ represents an alkyl group having 1 to 10 carbon atoms or an alkenyl group having 2 to 10 carbon atoms, in which at least one hydrogen atom present in the group may be substituted by a fluorine atom, and $R^4$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom; as a third component, at least one compound represented by general formula (III):

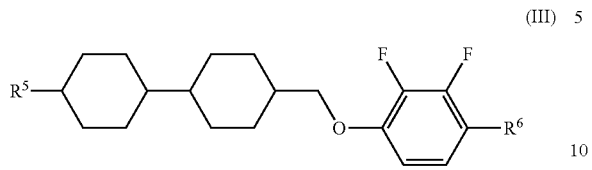
(III)

wherein $R^5$ represents an alkyl group having 1 to 10 carbon atoms or an alkenyl group having 2 to 10 carbon atoms, in which at least one hydrogen atom present in the group may be substituted by a fluorine atom, and $R^6$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom; and as a fourth component, at least one compound represented by general formula (IV):

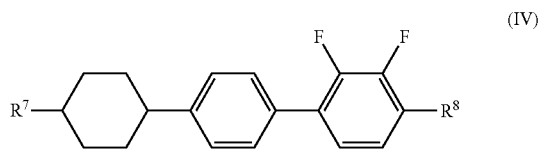
(IV)

wherein $R^7$ represents an alkyl group having 1 to 10 carbon atoms or an alkenyl group having 2 to 10 carbon atoms, in which at least one hydrogen atom present in the group may be substituted by a fluorine atom, and $R^8$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms, in which at least one hydrogen atom present in the group may be substituted by a fluorine atom.

2. The polymerizable compound-containing liquid crystal composition according to claim 1, comprising, as the first component, at least one compound of the general formula (I) wherein at least one of $X^1$ to $X^{12}$ is a trifluoromethyl group, a trifluoromethoxy group, a methyl group, a chlorine atom, or a fluorine atom.

3. The polymerizable compound-containing liquid crystal composition according to claim 1, comprising, as the first component, at least one compound of the general formula (I) wherein at least one of $X^1$ to $X^{12}$ is a methyl group or a fluorine atom.

4. The polymerizable compound-containing liquid crystal composition according to claim 1, comprising, as the first component, at least one polymerizable compound selected from those represented by general formulae (I-1) to (I-5):

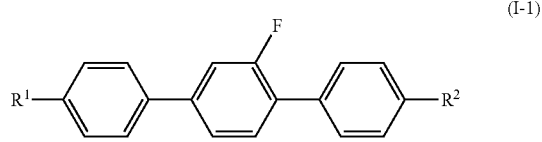
(I-1)

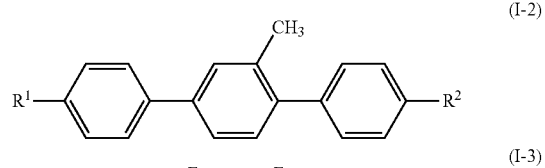
(I-2)

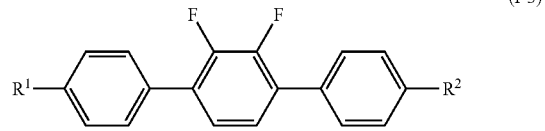
(I-3)

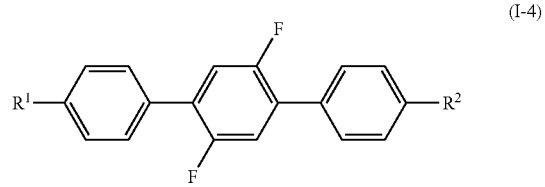
(I-4)

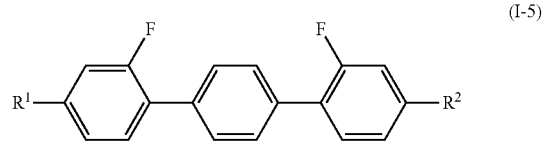
(I-5)

(wherein $R^1$ represents the same as in claim 1, and $R^2$ represents the same as in claim 1).

5. The polymerizable compound-containing liquid crystal composition according to claim 1, comprising, as the second component, at least one compound of the general formula (II) wherein $R^3$ is a linear alkyl group having 1 to 5 carbon atoms, and $R^4$ is a linear alkyl group having 1 to 5 carbon atoms or a linear alkoxy group having 1 to 5 carbon atoms.

6. The polymerizable compound-containing liquid crystal composition according to claim 1, comprising, as the third component, at least one compound of the general formula (III) wherein $R^5$ is a linear alkyl group having 1 to 5 carbon atoms, and $R^6$ is a linear alkyl group having 1 to 5 carbon atoms or a linear alkoxy group having 1 to 5 carbon atoms.

7. The polymerizable compound-containing liquid crystal composition according to claim 1, comprising, as the fourth component, at least one compound of the general formula (IV) wherein $R^7$ is a linear alkyl group having 1 to 5 carbon atoms, and $R^8$ is a linear alkyl group having 1 to 5 carbon atoms or a linear alkoxy group having 1 to 5 carbon atoms.

8. The polymerizable compound-containing liquid crystal composition according to claim 1, wherein the content of the first component is 0.01% by mass to 2.0% by mass.

9. The polymerizable compound-containing liquid crystal composition according to claim 1 comprising, as the first component, a compound of the general formula (I) wherein $R^1$ and $R^2$ each independently represent the general formula (R-1) or (R-2).

10. The polymerizable compound-containing liquid crystal composition according to claim 1, wherein a dielectric constant anisotropy (Δ∈) at 25° C. is in a range of −2.0 to −6.0, a refractive index anisotropy (Δn) at 25° C. is in a range of 0.08 to 0.13, a viscosity (η) at 20° C. is in a range of 10 to 30 mPa·s, and a nematic-isotropic liquid phase transition temperature ($T_{ni}$) is in a range of 60° C. to 120° C.

11. A liquid crystal display device comprising the polymerizable compound-containing liquid crystal composition according to claim 1.

12. An active matrix-driven liquid crystal display device comprising the polymerizable compound-containing liquid crystal composition according to any one of claim 1.

13. A liquid crystal display device of a VA mode, PSVA mode, IPS mode, or ECB mode comprising the polymerizable compound-containing liquid crystal composition according to any one of claim 1.

14. The polymerizable compound-containing liquid crystal composition according to claim 2, comprising, as the third component, at least one compound of the general formula (III) wherein $R^5$ is a linear alkyl group having 1 to 5 carbon atoms, and $R^6$ is a linear alkyl group having 1 to 5 carbon atoms or a linear alkoxy group having 1 to 5 carbon atoms.

15. The polymerizable compound-containing liquid crystal composition according to claim 3, comprising, as the third component, at least one compound of the general formula (III) wherein $R^5$ is a linear alkyl group having 1 to 5 carbon atoms, and $R^6$ is a linear alkyl group having 1 to 5 carbon atoms or a linear alkoxy group having 1 to 5 carbon atoms.

16. The polymerizable compound-containing liquid crystal composition according to claim 4, comprising, as the third component, at least one compound of the general formula (III) wherein $R^5$ is a linear alkyl group having 1 to 5 carbon atoms, and $R^6$ is a linear alkyl group having 1 to 5 carbon atoms or a linear alkoxy group having 1 to 5 carbon atoms.

17. The polymerizable compound-containing liquid crystal composition according to claim 5, comprising, as the third component, at least one compound of the general formula (III) wherein $R^5$ is a linear alkyl group having 1 to 5 carbon atoms, and $R^6$ is a linear alkyl group having 1 to 5 carbon atoms or a linear alkoxy group having 1 to 5 carbon atoms.

\* \* \* \* \*